Aug. 5, 1924.

C. H. KRUSE ET AL 1,503,794

RIDGER AND GAP FILLING MACHINE

Filed Aug. 21, 1922

INVENTORS

Charles H. Kruse
Charles M. Goodwin

BY John A. Naismith

ATTORNEY

Patented Aug. 5, 1924.

1,503,794

UNITED STATES PATENT OFFICE.

CHARLES H. KRUSE, OF COYOTE, AND CHARLES M. GOODWIN, OF SANTA CLARA, CALIFORNIA; SAID GOODWIN ASSIGNOR TO SAID KRUSE.

RIDGER AND GAP-FILLING MACHINE.

Application filed August 21, 1922. Serial No. 583,255.

*To all whom it may concern:*

Be it known that we, CHARLES H. KRUSE and CHARLES M. GOODWIN, citizens of the United States, and residents of Coyote and Santa Clara, respectively, in the county of Santa Clara and State of California, have invented certain new and useful Improvements in Ridger and Gap-Filling Machines, of which the following is a specification.

It is one object of our invention to provide a simple and efficient device for throwing up ridges for irrigation purposes in plowed lands.

It is another object of our invention to provide an automatic means operable by contact with one set of said ridges for filling up the gaps cut in the said ridges by the device when forming a second set of ridges intersecting the said first set of ridges.

In the drawing:—

Figure 1:
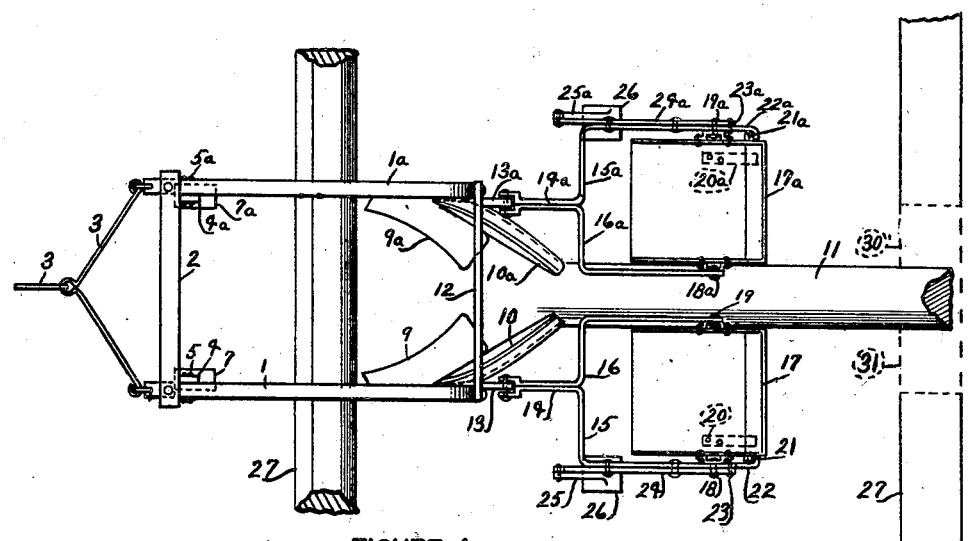
Figure 1 is a plan view of our improved ridger and gap filling machine.
Figure 2:
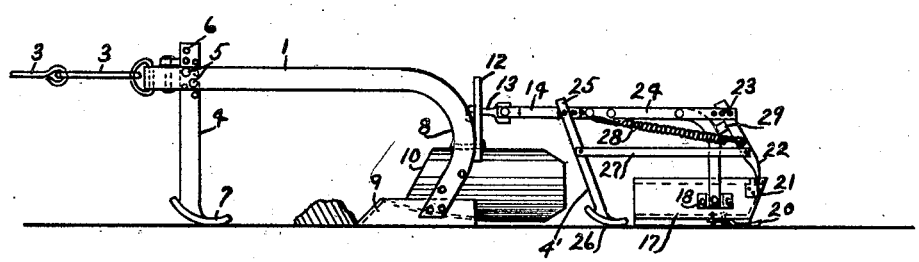
Figure 2 is a side elevation of the same.
Figure 3:
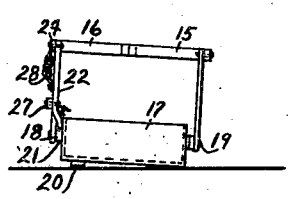
Figure 3 is a rear end elevation of one of the scoops forming part of the machine.

Referring more particularly to the drawing, we show at 1—1 two parallel side bars spaced by a cross bar 2 and fitted with draft bars as 3.

Inasmuch as the two sides of the device are identical in construction we will describe one side thereof in detail and indicate corresponding parts in the other side by means of similar numerals followed by a suitable letter.

On the forward end of said bar 1 is mounted a vertical leg 4 by means of bolts 5 engaging pairs of orifices 6, several pairs of orifices being formed in said leg as shown to permit its vertical adjustment. On the lower end of leg 4 is formed a forwardly and upwardly curving shoe as 7 which permits the supporting leg 4 to be drawn forwardly over the surface of the ground thereby acting, in fact, as a substitute for a wheel.

The rear end of bar 1 curves downwardly and thence forwardly as at 8 and carries a plow share 9 and a moldboard 10, these parts being formed and positioned as to throw the earth inwardly toward the draft line of the device to form a ridge such as indicated at 11.

Connecting the curved ends of bars 1—1 is a cross bar 12. To bar 12 in substantial alignment with bar 1, is attached a clevis 13 to which is pivotally connected a draw bar 14 forked as at 15 and 16 and pivotally connected to a scoop shovel 17 as at 18 and 19 respectively, the said pivotal points being preferably located to the rear of the scoop and on the sides thereof.

On the bottom of the rear outer corner of the scoop 17 is secured a shoe 20 whereby the said scoop is tipped toward its forward and inward corner. By means of this construction the said forward and inner corner is held down so that when the scoop is released as hereinafter described it will immediately dig into the ground and cause the scoop to revolve.

The scoop is normally held in an operable position by means of a stop 21 arranged on the side thereof near its rear end, and a bar 22 normally engaging said stop and pivotally mounted as at 23 upon a substantially horizontal bar 24 securely mounted in a fixed position on fork 15 of bar 14.

Bar 24 extends slightly forwardly of fork 15 and has a leg 25 pivotally mounted thereon carrying a shoe 26 at its lower end. At 27 is shown a link connecting leg 25 and bar 22, and at 28 is a spring connecting bars 24 and 22. Several holes are provided in bar 24 to permit adjustment of leg 25 and bar 22. The spring 28 serves to normally hold bar 22 in an operative position with relation to stop 21, a second stop being indicated at 29 and mounted on fork 15 to prevent bar 22 moving too far in that direction under the action of spring 28.

In using this device one set of ridges such as 11 are formed by means of the ridger itself without the scoop attachments.

In forming the cross ridges 27, however, the first ridges 11 are cut through as at 30—31 leaving gaps that must be filled in in some manner. With my improved machine these gaps are automatically filled because the scoops above described are attached to the ridger and follow closely behind it. When, therefore, one ridge 11 is cut through the shoe 26 on leg 4', being offset with relation to the plow 9—10 engages the said cut ridge and in riding up over it forces bar 22 out of engagement with stop 21 whereupon the forward pull of draw bar 14 causes the forward edge of the scoop to dig into the ground and discharge its contents into the gap in ridge 11. The continued pull of bar 14, of course, causes the scoop to continue to revolve until the stop 21 again engages bar 22 which has been returned to its normal position by spring 28. As the scoop moves forwardly it gathers a new load of dirt which is automatically dumped into the gap in the next cross ridge 11 as hereinbefore described.

It is to be understood, of course, that while we have herein shown and described one specific embodiment of our invention, changes in form, construction and method of operation may be made within the scope of the appended claims.

We claim:—

1. In a device of the character indicated a gap closing machine comprising a revoluble scoop, a draft bar therefor, means carried by said draft bar for normally locking said scoop in operative relation to the ground, a shoe pivotally mounted on said draft bar, and a connection between said shoe and locking means for disengaging said locking means.

2. In a device of the character indicated a gap closing machine comprising a revoluble scoop, a draft bar therefor, means carried by said draft bar for normally locking said scoop in operative relation to the ground, a shoe pivotally and adjustably mounted on said draft bar, and a connection between said shoe and locking means for disengaging said locking means.

3. In a device of the character indicated, a gap closing machine comprising draft arms, a scoop pivotally mounted therebetween, a stop on said scoop, an arm pivotally mounted on said draft arms, resilient means for normally holding said arm in engagement with said stop, a leg pivotally mounted on said draft arms, a shoe carried by said leg, and a link connecting said leg and stop engaging arm.

4. In a device of the character indicated a gap closing machine, comprising a revoluble scoop, a draft bar therefor, means carried by said draft bar for normally locking said scoop in operative relation to the ground, a shoe pivotally mounted on said draft bar, and a connection between said shoe and locking means for disengaging said locking means, and means mounted on said scoop for normally holding the same at an angle to the ground.

5. In a device of the character indicated a gap closing machine comprising a revoluble scoop, a draft bar therefor, means carried by said draft bar for normally locking said scoop in operative relation to the ground, a shoe pivotally mounted on said draft bar, and a connection between said shoe and locking means for disengaging said locking means, and means mounted upon one rear corner of said scoop for normally tilting the same forwardly upon the opposite corner.

CHARLES H. KRUSE.
CHARLES M. GOODWIN.